Patented July 3, 1923.

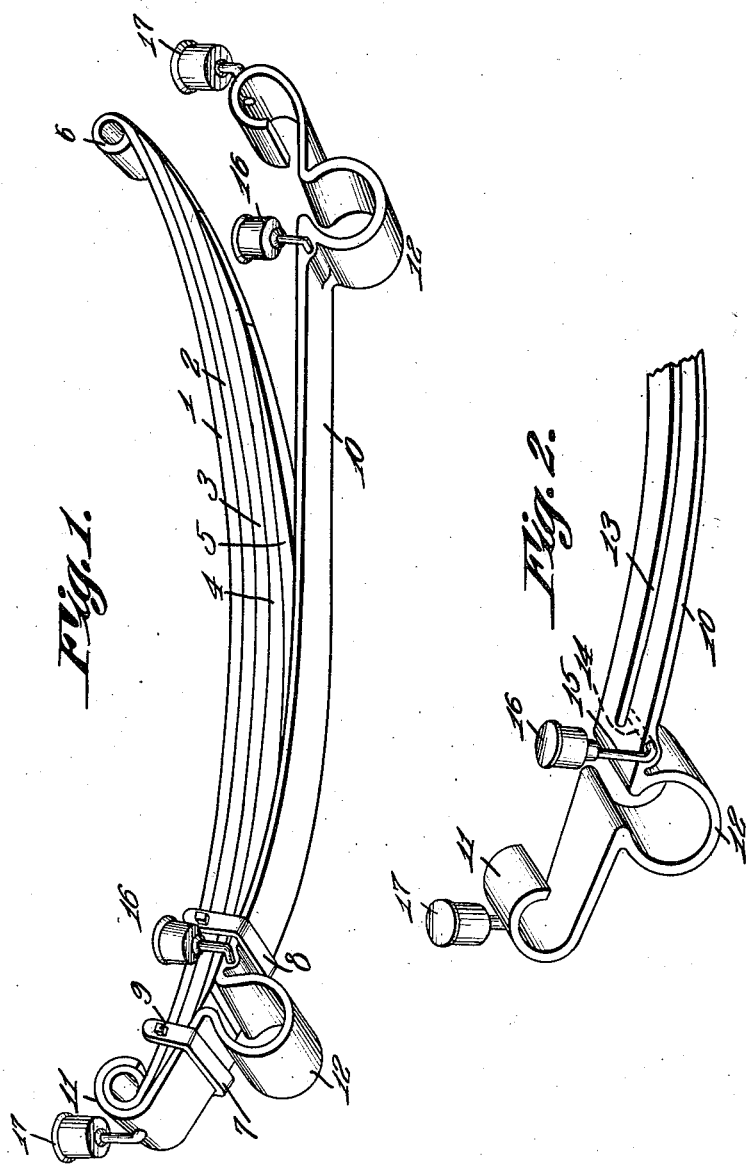

UNITED STATES PATENT OFFICE.

JOHN PEYREE, OF SALEM, OREGON.

COMBINED SHOCK ABSORBER AND OILING ATTACHMENT FOR VEHICLE SPRINGS.

Application filed June 12, 1922. Serial No. 567,730.

*To all whom it may concern:*

Be it known that I, JOHN PEYREE, a citizen of the United States, residing at Salem, in the county of Marion and State of Oregon, have invented a new and useful Combined Shock Absorber and Oiling Attachment for Vehicle Springs, of which the following is a specification.

This invention relates to vehicle springs of the leaf type.

The object of the invention is to provide a combined shock absorber and oiling attachment for springs of this character which may be readily applied to springs already in use and supply oil to the respective leaves of the spring to prevent rusting or squeaking and thereby prolong the life of the spring as well as to eliminate the objectionable noises.

Another object is to provide a simple device of this character which may be readily snapped onto the spring in connection with which it is to be used, and additionally secured by the clips which hold the leaves of the spring together, and which will compensate for the rebound when the vehicle wheels pass over rough places in the road.

With the foregoing and other objects in view which will appear as the description proceeds, the invention resides in the combination and arrangement of parts and in the details of construction hereinafter described, and claimed, it being understood that changes in the precise embodiment of the invention herein disclosed may be made within the scope of what is claimed without departing from the spirit of the invention.

In the accompanying drawings:—

Figure 1 represents a perspective view of a spring equipped with this improved attachment, one end of which is shown engaged with the spring, and the other end in the position before it is flexed into operative engagement with the spring, and Fig. 2 is a detail perspective view of one end of the attachment.

In the embodiment illustrated, the attachment 10 constituting this invention is shown applied to a vehicle spring composed of the usual leaves, 1, 2, 3, 4, and 5, which are arranged in superposed relation from the upper toward the lower, as is usual with springs of this character, and which are held assembled by clips 8 and 9, a pair of which is applied to each end of the spring, one pair only being here shown. The uppermost or longest leaf 1 of the spring has its opposite ends rolled to form bearings 6 to receive the bolt which connects the spring to the shackle (not shown). The clips 7 and 8 are held in operative position on the spring leaves by bolts 9 as is ordinary with springs of this character.

The device constituting this invention comprises a metal strip 10 of a width preferably corresponding to the width of the leaves of the spring in connection with which it is to be used, so that it may be held in assembled position by the spring securing clips 7 and 8. This strip 10 which is designed to fit under the vehicle spring, is provided at its opposed ends with rolled clamping elements or catches 11 which are designed to be snapped around the bearings 6 at the ends of the spring when the attachment is applied. This strip 10 is also provided near its opposite ends with outwardly extending loops 12 which are designed to permit longitudinal yielding of the strip to adapt it to be snapped over the bearings 6 in the manner above described, and also to operate as a shock absorber or snubber. These loops 12, when the attachment is applied, are positioned between the clips 7 and 8 as is shown clearly at the left of Fig. 1, it of course being understood that in the application of the attachment, the clips are first removed and the strip 10 arranged under the spring with the catches 11 snapped into engagement with the bearings 6. The clips are then replaced one on each side of each of the loops 12.

The strip 10 has a longitudinally extending groove 13 on its inner face with a lateral conduit 14 leading therefrom through one edge of the strip 10 at the end of the groove, and which is designed to receive a pipe 15 connected with a grease cup 16. This pipe 15 is shown L-shaped so that the cup 16 will be held in upright position when the attachment is applied to prevent the oil from running out of the cup and being wasted, and to insure a proper supply for the oiling groove 13.

When the attachment is applied, the groove 13 will be positioned under the spring in close contact therewith and will overlap the ends of the respective leaves so that the oil flowing therethrough will be fed between the leaves from the ends thereof. The oil so fed to the leaves will work down between them and properly lubricate them avoiding rusting thereof and disagreeable squeaking noises incident thereto.

Strip 10 has oil cups 17 on its ends, as shown in Fig. 1. These cups bite into hook 11 so as to oil strips 1 and 2.

From the above description it will be obvious that an attachment of this character may be very cheaply constructed and applied to springs already in use, the loops 12 permitting them to yield longitudinally so that in addition to facilitating the application of the attachment they operate as springs to prevent the catches from being pulled away from bearings 6.

I claim:—

1. An oiling attachment for vehicle springs comprising a strip having oil supplying means on its inner face with its ends rolled to form attaching elements, and an open loop formed intermediate the ends of said strip to permit its longitudinal yielding to facilitate its attachment.

2. An oiling attachment for vehicle springs comprising a strip having oil supplying means on its inner face with its ends rolled to form attaching elements, said strip being provided near its opposite ends with loops to provide for its ready application and to permit it to fit springs of varying lengths.

3. An attachment for vehicle springs comprising a strip of a length to fit under the spring in connection with which it is to be used and having rolled ends to form attaching elements, said strip having longitudinally spaced loops to permit it to yield longitudinally, and to operate as a shock absorber.

In testimony that I claim the foregoing as my own, I have hereto affixed my signature in the presence of two witnesses.

JOHN PEYREE.

Witnesses:
C. W. KIRK,
W. C. WINSLOW.